United States Patent [19]

Odell

[11] Patent Number: 5,312,005

[45] Date of Patent: May 17, 1994

[54] RACK RELEASE MOUNTING ASSEMBLY

[76] Inventor: Gordon T. Odell, 281 S. Madison Ave., No. 206, Pasadena, Calif. 91101

[21] Appl. No.: 735,446

[22] Filed: Jul. 25, 1991

[51] Int. Cl.$^5$ ............................................. A47F 5/00
[52] U.S. Cl. ..................................... 211/189; 211/26; 411/389; 411/397
[58] Field of Search .................. 211/26, 189, 190, 186; 411/389, 397, 396, 410, 408, 383

[56] References Cited

U.S. PATENT DOCUMENTS

| | | | |
|---|---|---|---|
| 2,189,993 | 2/1940 | Ramsey | 211/26 |
| 3,050,194 | 8/1962 | Sinninger | 108/106 |
| 3,073,206 | 1/1963 | Rudolph | 411/410 |
| 3,905,483 | 9/1975 | Patrick | 211/26 X |
| 4,331,414 | 5/1982 | Wheatley | 411/389 X |
| 4,930,962 | 6/1990 | Reynolds | 411/389 X |

Primary Examiner—Robert W. Gibson, Jr.
Attorney, Agent, or Firm—Thomas A. Turner, Jr.

[57] ABSTRACT

A modular unit having a slot or prepared hole on a face plate is mounted to a rack by a threaded fastener having at least a first and a second threaded portions along its length. A nut for fastening to the second portion of the threaded fastener is designed to have a greater diameter and a pitch predetermined for quick assembly and release, while the first portion is fastened to a rack.

4 Claims, 2 Drawing Sheets

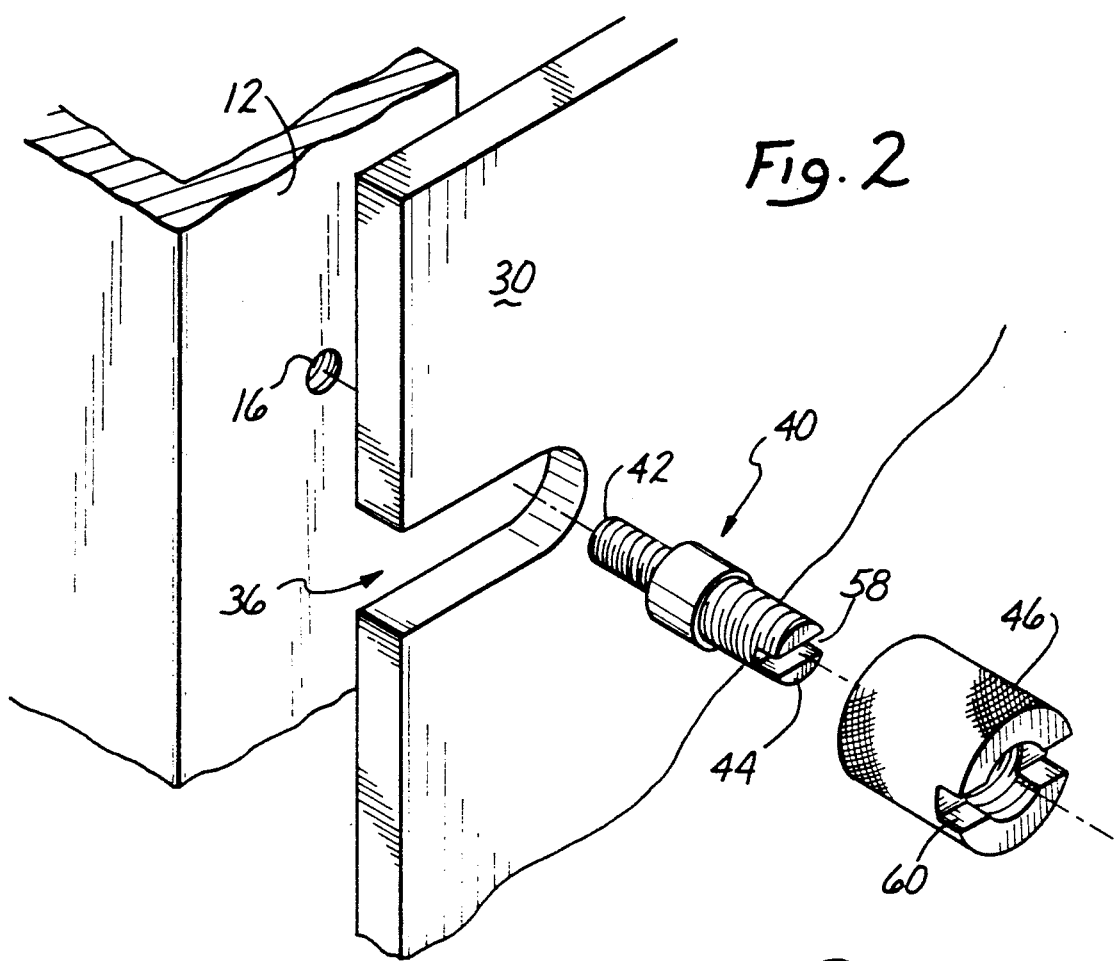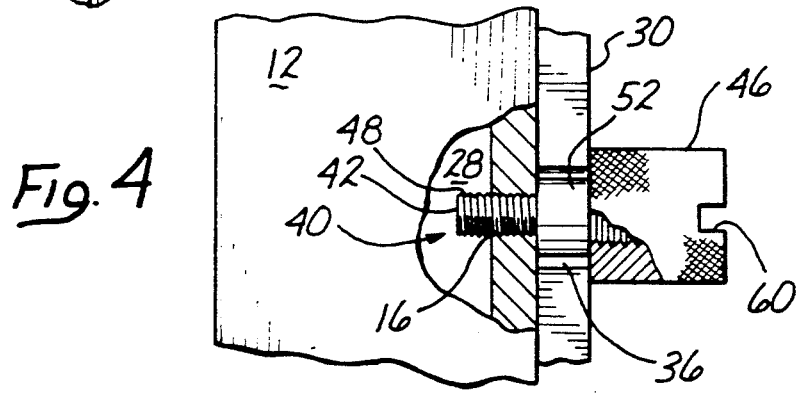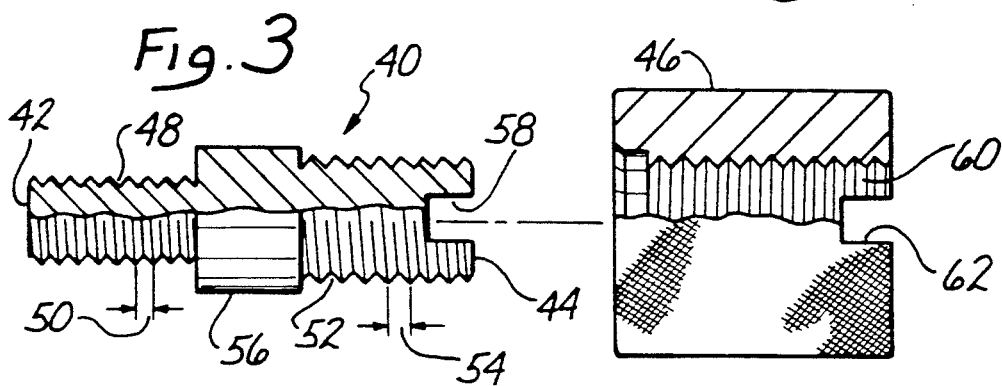

RACK RELEASE MOUNTING ASSEMBLY

BACKGROUND OF THE INVENTION

1. Field of the Invention

The present invention relates to the art of threaded fastening, and more particularly to the art of fastening modular units to racks.

2. Description of the Prior Art

In the past, many persons have required assembly of multiple modular units on a rack for jobs that have a short or limited time duration, and have required the disassembly of the modular units after the job is completed. Such persons, such as musicians performing for only one or a few performances before traveling to another job location, are frequently faced with a time constraint to satisfy which it is desired to reduce or eliminate all tasks that consume time and that are tedious.

When such persons, such as musicians for example, are required to set up their equipment, they must assemble the various electronic equipment which very often comes in modular units. The modular units are assembled onto a rack with their face plates facing towards one direction, usually facing towards the member of the group who is responsible for adjusting the variable options available on the electronic or similar equipment.

Frequently, it is desired, if not imperative that such modular equipment be assembled in a very short time period. The assembly of the modular units on a rack has been time consuming in the past, owing largely to various means for fastening the modules to the rack which are tedious, require special implements such as screw drivers, and require both hands to insert a single fastener. These fasteners, therefore, are frequently screws which must drive through the module and into the rack by a screw driver. Each screw requires both hands to drive the screw through the module and into the rack. Someone else must hold the module while first one, then a second and possibly more screws are individually driven to form the fastening.

It is desired to provide a fastening structure or assembly which can be accomplished using a single hand, thus freeing the other hand for holding the module or for other uses as desired. It is further desired to provide a rack fastening structure or assembly that allows for quick assembly or fastening and quick release, in order to facilitate and speed the assembly and disassembly process. It is yet further desired to provide a rack and module fastening assembly or structure that is efficient and more easily handled, in order to reduce the tedium of the rack and module assembly procedures.

SUMMARY

In brief, in accordance with one aspect of the present invention a threaded fastener has two portions measured as lengths from the two ends. A central portion of the fastener's length is without threads. A rack has threaded holes on both of front facing vertical rails, sometimes called channels or beams which comprise part of the face or front facing side of a rack. The front facing side of the rack is designed to receive modular units, such as electronic equipment modules as are used, for example, by musicians when performing or their technicians in, for example, recording studios. Stage technicians frequently need to set up racks of modular equipment to control props lighting and the like. Modular units, or modules are inserted through the front facing side of the rack and are designed to meet the racks vertical channels or rails. Spaces, such as holes or slots are formed in the front or face plate of the module and are designed to align with threaded holes formed in the front facing, vertical channels of the rack.

The threaded fastener has complemental threads to receive and fasten one of the portions within the threaded holes of the vertical channels of the rack. The non-threaded portion of the fastener accepts the weight of the face plate of the module. The fastener's second threaded portion, having the greater pitch receives a complementally threaded nut. The greater pitch on the nut and second threaded fastener portion allows for more rapid assembly and release of the nut from the threaded fastener and consequently, more quickly allows for assembly and disassembly of the module from the rack. Moreover, the nut can be twisted onto the complementally threaded fastener portion protruding from the rack, without the necessity of a screwdriver or other implement. A hand of the assembler is thus freed to hold the module while the module is being fastened to or disassembled from the rack, or the hand may be used in any other task as may be desired.

The pitch on at least one of the portions in an alternative embodiment can be substantially greater than standard, to provide for more quick removal of the nut or knob from the fastener.

Other novel features which are believed to be characteristic of the invention, both as to organization and methods of operation, together with further objects and advantages thereof, will be better understood from the following description in which preferred embodiments of the invention are described by way of example.

BRIEF DESCRIPTION OF THE DRAWINGS

FIG. 2 is a partial, exploded view of the preferred embodiment of the present invention showing the components in an assembly exploded for clarity;

FIG. 3 is a side elevational, partially cut away view of the preferred embodiment of the invention, showing a threaded fastener and nut in alignment and part of each cut away for clarity in understanding the invention; and, FIG. 4 is a side elevational, partially cut away view of the preferred embodiment showing the threaded fastener assembled with a rack and module, having portions thereof cut away from clarity in understanding the invention.

DESCRIPTION OF THE PREFERRED EMBODIMENT

Figure 1:
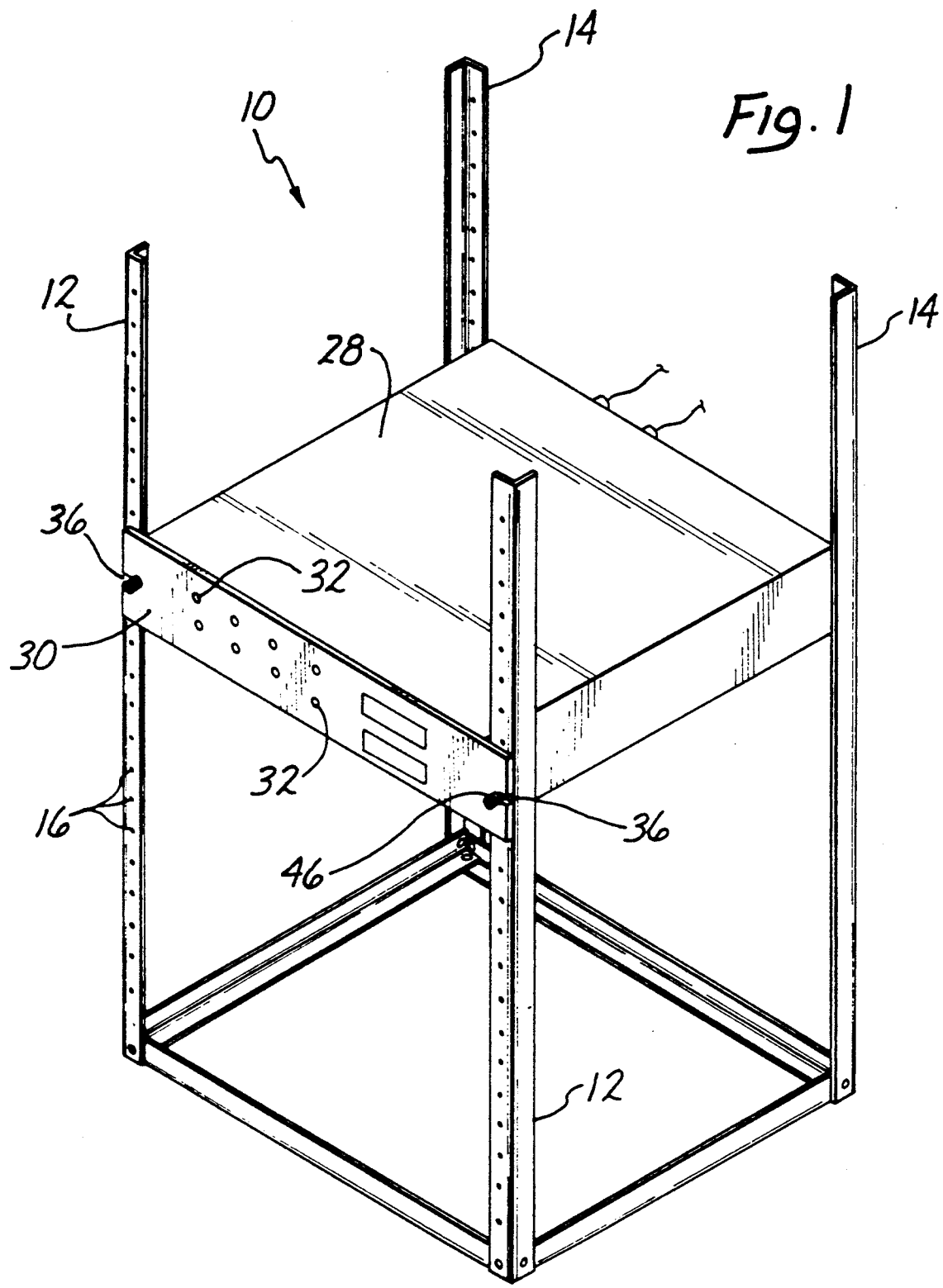
FIG. 1 is a perspective view of the preferred embodiment of the invention as used in the environment of a rack and module assembly.

A better understanding of the invention may be had with reference to the accompanying drawings in which FIG. 1 shows a rack 10 is made of four rails, sometimes also called channels or beams arranged vertically. Two front facing rails 12 and two parallel rails 14 have holes 16 formed therein. The holes 16 are threaded to received complementally threaded screws or fasteners, as will be explained in greater detail below. Each hole 16 on one channel or rail 12 is aligned substantially horizonally with a corresponding hole 16 on the remaining front facing, parallel channel or rail 12.

An electronic modular unit or module 28 is inserted through the front face of the rack 10. The module 28 has a front or face plate 30 in which receptacle holes are formed to receive jacks and other electrical or perhaps audio connections. The face plate 30 also has two oppositely directed slots 36 from into the face plate 30 from the opposing side ends or edges.

As better seen in the exploded view of FIG. 2, each of the slots 36 define a space removed from the face plate 30. Each slot 36 is capable of being positioned in alignment with a threaded hole 16 on a corresponding vertical channel 12 of the front of the rack 10. A threaded fastener 40 is then inserted through the slot 36 by the fastener's leading end 42, and a first portion 48 of the fastener 40 is threadedly secured within the hole 16, which has a thread pitch complemental to the threads of the first portion 48, as may be better appreciated when viewed in conjunction with FIG. 3 of the drawings.

In FIG. 3, the threaded fastener 40 is shown in side elevation, having portions cut away for clarity. The threaded fastener 40 has two ends along the cylindrical or longitudinal length, a leading end 42 and a securing end 44. Depending along the cylindrical length from the leading end 42 is a first portion 48 defined by threads having the pitch 50. For purposes of the description given in this specification, the pitch shall mean and be used to describe the axial distance between adjacent crests of the threads. Depending along the cylindrical length from the securing end 44 is a second threaded portion 52 having threads formed thereon having a pitch 54. The securing end 44 also has a notch or U groove 58 formed therein to receive a screwdriver or other implement, as optionally may be desired, as will be explained in greater detail below. The threaded fastener 40 also has along its cylindrical length a third portion 56 defined by the absence of threads. This third portion 56 is designed to support the load or weight of a module 28 when the assembly is completed. The direction of the threads on both portions 48, 52 are in the same direction. The diameter of the portion 52 is shown substantially larger than the diameter of the portion 48.

In FIG. 3, further, is shown a nut 46 having an interior 60 with threads formed therein complemental to the pitch 54 of the threaded second portion 52 of the fastener 40. The nut 46 also has a notch or U grove 62 formed in one cylindrical end. The notch 62 is designed to receive a screwdriver or other like implement, as will be explained in greater detail below.

With reference to FIG. 4, the module 28 can be assembled to the rack 10 by means of the threaded fastener 40 and nut 46. The module 28 is inserted into the rack 10 from or through the front facing side of the rack 10. The face plate 30 of the module 28 is aligned flush with the front facing side of the vertical channels 12 so that the slots 36 align with a corresponding threaded hole 16 of the rack 10. The leading end or edge 42 of the threaded fastener 40 is inserted through the slot 36 of the face plate 30 of the module 28. The face plate 30 rests upon the relatively smooth, non-threaded portion 56 of the threaded fastener 40. The nut 46 is fastened onto the second portion 52 of the threaded fastener 40 so that the nut 46 abuts the face plate 30. The nut may be driven by a screwdriver or other implement by inserting the working part of the screwdriver into the notch or U grove 60 and twisting the nut 46 to drive the nut more close to the face plate 30 and secure the nut 46 by frictional engagement with the face plate 30 and consequently, secure the face plate 30 by frictional engagement with the rail 12, if desired.

There are many applications, as those skilled in the art may appreciate, when it will not be necessary or even desirable to use a screwdriver or other implement to form such a secured, frictional fastening. The desired tightness may be achieved simply by mere use of the hand twisting the nut 46 onto the second portion 52 of the threaded fastener 40.

In an alternative embodiment, the pitch 54 of the threads on the second portion 52 of the fastener 40 is made substantially greater than conventional pitches of threaded fasteners. The pitch of the complementally threaded interior 60 of the nut 46 are, likewise, substantially greater than conventional pitches. The pitch 50 of the first portion 48 of the threaded fastener 40 may have a traditional pitch. It has been found that the lesser the pitch, the more secure the fastener is fastened to the object into which it is inserted. The weight of the module 28 will be borne by the non-threaded portion 56 of the fastener 40, and the moment exerted by the module on the fastener 40 in the assembly will be against the position of the fastener 40 within the hole 16 of the rack 10. The second threaded portion 52 will not bear any loading of the module 28. Thus, the nut 46 serves primarily to restrict axial movement of the module 28, and the requirement for security of the fastening by the nut 46 with the second portion 52 is not as great.

In operation, the threaded fastener may be used to secure a module 28 to a rack 10, as shown best in FIG. 4 of the drawings, and as explained above. One hand of the assembler can hold the module 28 while the other inserts the leading end 42 through a preselected hole 16 of the vertical rail 12. A second fastener can be inserted into a oppositely aligned hole 16 of a parallel rail 12, as well, after the first fastener is inserted. The module 28 can then be inserted through the front side of the rack 10, aligning the slots 36 with the now protruding second threaded portions 52 of the fasteners 40 protruding from the front side of the rack 10.

The face plate 30 of the module 28 can then be positioned flush with the rails 12 so that the face plate rests on the non-threaded portion 56 of the threaded fastener 40. While one hand of the assembler holds the module steady, a nut 46 can be threadenly fastened onto the second portion 52 of one of the threaded fasteners 40 protruding through its corresponding slot 36 to the front of the rack 10. Additional nuts 46 can then, in order, be secured to corresponding second portions 52 of additional threaded fasteners 40 until the module 28 is satisfactorily secured to and within the rack 10.

Disassembly is achieved with the same procedure in reverse order. The nuts 46 can be removed with greater speed and ease than removal of conventional threaded fasteners, as the pitch 54 of the second portion 52 of the threaded fastener 28 as well as the complemental pitch of the interior 60 of the nut 46 are substantially greater than the normal threads for such fastenings.

The substantially larger size of the knob or nut 46 will allow faster turning of the knob 46 and consequently make the disassembly process faster. If the pitch 54 is greater, there are fewer revolutions necessary to remove a completely fastened nut 46, increasing the speed with which the knob or nut can be assembled and disassembled.

Other variations and modifications of the preferred embodiment may be appreciated by those skilled in the art. For example, the fastening of the present invention will work and achieve the desired objectives where there is no non-threaded portion, as the description of the preferred embodiment sets forth herein. Moreover, the pitch of the first threaded portion 48 of the threaded fastener 40 may be made greater, so as to make more easy and more rapid the fastening of the leading end 42 within the holes 16 of the rack 10.

The foregoing detailed description of my invention and of preferred embodiments, as to products, compositions and processes, is illustrative of specific embodiments only. It is to be understood, however, that additional embodiments may be perceived by those skilled in the arts. The embodiments described herein, together with those additional embodiments, are considered to be within the scope of the present invention.

I claim:

1. A fastener means for allowing fastening to and removal from a rack at least one plate having a thickness and having spaces formed in said plate through said thickness, comprising:
   a. a rack having a plurality of substantially parallel rails in each of which rails threaded holes are formed, each of said holes being positioned substantially level with a corresponding hole in another of said parallel rails;
   b. threaded fastener means having opposite first and second ends defining a length therebetween, for connecting said at least one plate to said rack, said threaded fastener means comprising:
      i. a first portion defined by a length depending from the first of said ends along said length of said threaded fastener means, said first portion having threads thereon at a pitch complemental to said threaded holes in said parallel rails receiving said first portion; and,
      ii. a second portion defined by a length depending from said second end along said length of said threaded fastener means, said second portion having threads formed at a pitch predetermined to facilitate assembly and disassembly, and said second portion comprising a head indentation depending from said second end, said head indentation being capable of receiving a screwdriver; and,
   c. threaded nut means for securing said at least one plate to said rack, said nut means having a thread formed therein at a pitch complemental to said threads of said second portion of said threaded fastener means, said nut means having an outside diameter substantially greater than a diameter of said threaded fastener means, and capable of engaging said plate when said nut means is threaded onto said second portion of said threaded fastener means and said threaded fastener means is positioned through said space of said at least one plate.

2. The fastener means of claim 1 wherein said nut means further comprises a substantially cylindrical shape having two parallel ends.

3. A fastener means for allowing fastening to and removal from a a rack at least one plate having a thickness and having spaces formed in said plate through said thickness, comprising:
   a. a rack having a plurality of substantially parallel rails in each of which rails threaded holes are formed, each of said holes being positioned substantially level with a corresponding hole in another of said parallel rails, said at least one plate further comprising a module attached to said plate, said module having a size capable of being passed through said substantially parallel rails;
   b. threaded fastener means having opposite first and second ends defining a length therebetween, for connecting said at least one plate to said rack, said threaded fastener means comprising:
      i. a first portion defined by a length depending from the first of said ends along said length of said threaded fastener means, said first portion having threads thereon at a pitch complemental to said threaded holes in said parallel rails receiving said first portion; and,
      ii. a second portion defined by a length depending from said second end along said length of said threaded fastener means, said second portion having threads formed at a pitch predetermined to facilitate assembly and disassembly; and,
   c. threaded nut means for securing said at least one plate to said rack, said nut means having a thread formed therein at a pitch complemental to said threads of said second portion of said threaded fastener means, said nut means having an outside diameter substantially greater than a diameter of said threaded fastener means, and capable of engaging said plate when said nut means is threaded onto said second portion of said threaded fastener means and said threaded fastener means is positioned through said space of said at least one plate.

4. A fastener means for allowing fastening to and removal from a rack at least one plate having a thickness and having spaces formed in said plate through said thickness, said rack having a plurality of substantially parallel rails in each of which rails threaded holes are formed, each of said holes being positioned substantially level with a corresponding hole in another of said parallel rails, comprising in combination:
   a. threaded fastener means having opposite first and second ends defining a length therebetween, for connecting said at least one plate to said rack, said threaded fastener means comprising:
      i. a first portion defined by a length depending from the first of said ends along said length of said threaded fastener means, said first portion having threads thereon at a pitch complemental to said threaded holes in said parallel rails receiving said first portion; and,
      ii. a second portion defined by a length depending from said second end along said length of said threaded fastener means, said second portion having threads formed at a pitch predetermined to facilitate assembly and disassembly, and said second portion comprising a head indentation depending from said second end, said head indentation being capable of receiving a screwdriver; and,
   b. threaded nut means for securing said at least one plate to said rack, said nut means having a thread formed therein at a pitch complemental to said threads of said second portion of said threaded fastener means, said nut means having an outside diameter substantially greater than a diameter of said threaded fastener mean, and capable of engaging said plate when said nut means is threaded onto said second portion of said threaded fastener means and said threaded fastener means is positioned through said space of said at least one plate.

* * * * *